(No Model.)
J. CHRISTIANSEN.
APPARATUS FOR PREPARING CLAY FOR MOLDING BRICKS, &c.
No. 309,766. Patented Dec. 23, 1884.
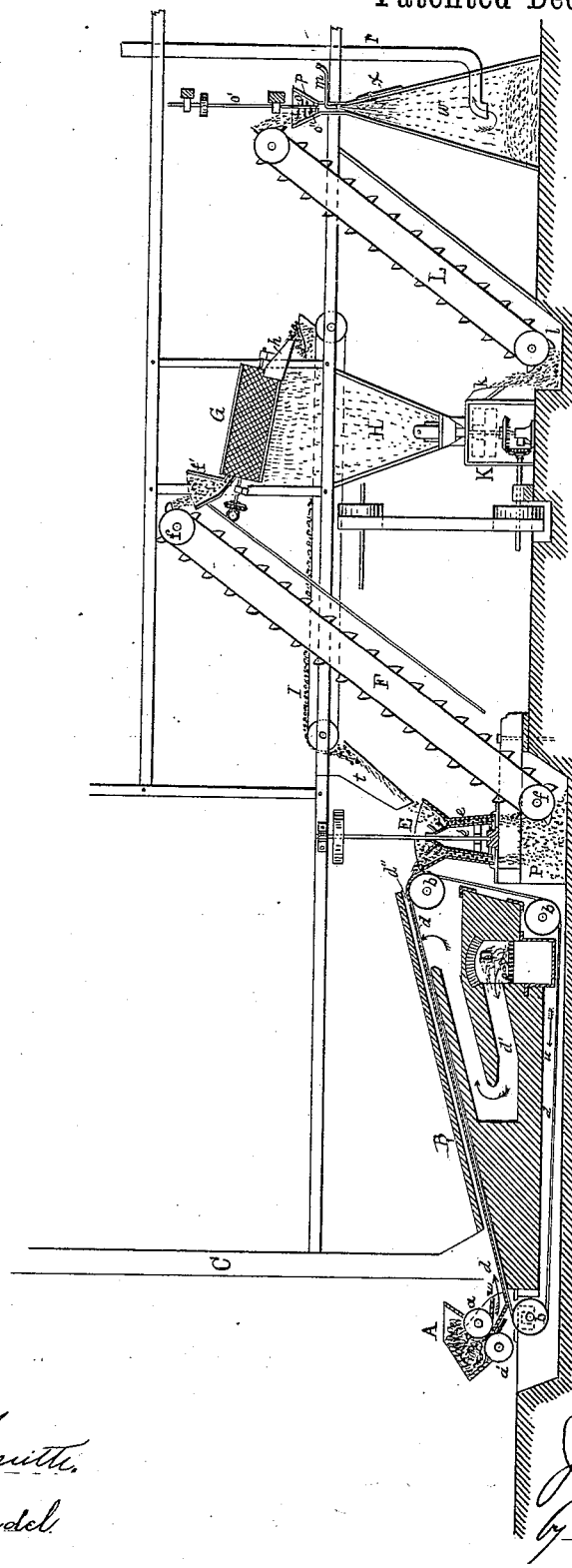
Witnesses.
Inventor

UNITED STATES PATENT OFFICE.

JOHN CHRISTIANSEN, OF CHICAGO, ILLINOIS, ASSIGNOR OF ONE-HALF TO EDWARD H. CALLAWAY, OF SAME PLACE.

APPARATUS FOR PREPARING CLAY FOR MOLDING BRICKS, &c.

SPECIFICATION forming part of Letters Patent No. 309,766, dated December 23, 1884.

Application filed September 24, 1884. (No model.)

*To all whom it may concern:*

Be it known that I, JOHN CHRISTIANSEN, a citizen of the United States, residing at Chicago, in the county of Cook and State of Illinois, have invented certain new and useful Improvements in Apparatus for Preparing Clay for Molding Bricks, Tiles, and for other Purposes; and I do hereby declare the following to be a full, clear, and exact description of the invention, such as will enable others skilled in the art to which it appertains to make and use the same.

This invention relates to improvements in machinery and apparatus for preparing clay for molding bricks, tiles, or for any other purpose, which will be hereinafter more fully described, and pointed out in the claims.

The drawing accompanying and forming part of this specification represents a vertical longitudinal section through a building in which the several machines and apparatus are placed, and which will now be described.

A is a crushing-machine, in which there are two rollers, $a\ a$, within a hopper. This is a well-known appliance for crushing the lumps of clay as they come from the bank or pit. Its present purpose is to deliver the clay from between the rollers in an even sheet of uniform thickness to an endless apron, $d$, which is continually traveling in the direction of arrows $u\ u$ over the rollers $b\ b\ b$, which are operated by machinery not shown in the drawing. This apron is made of perforated iron slats hinged together to permit the hot air to pass under and through the clay.

The drying apparatus B consists of an ordinary reverberating furnace (shown in section) having the fire-box D, the rising flue $d'\ d'$, and descending flue $d''$, through which latter the endless apron $d$ conveys the clay upwardly against the descending current of smoke and heated air as they pass down to the chimney C.

Immediately adjacent to furnace D is the disintegrator E, consisting of an outer stationary shell, $e$, with an interior cylinder, $e'$. Both of these have prongs or teeth so arranged as to pass each other, but very closely, so as to stir up and break very minutely all of the lumps of clay as they are passed downward from the endless apron $d$ and fall into the disintegrator.

Should there be any stones mixed with the clay, they are thus liberated by the action of the teeth, and the clay is thoroughly mixed by the time it passes downward and is deposited in the pit P below. The endless chain of buckets or elevator F, moved by machinery over the wheels $ff$, conveys the clay up to the top of the second story of the building, and the clay is emptied into the hopper $f'$, and thence into a revolving or shaking sieve G, which has a netting of a mesh fine enough to exclude stones and pebbles, which will pass out at the lower end, $h$, and the fine clay will drop through the sieve into the hopper H, and from thence is drawn off into a grinding-mill, K, supplied with stones or other grinding apparatus, which grinds the clay into an impalpable powder. The pebbles, which may have some clay still adhering, are conveyed by an endless apron, I, back into the hopper of disintegrator E through the chute $t$. The clay, upon being ground in mill K, is passed out through the trough $k$ into a pit, $b$, and is taken from thence by the elevator L and discharged at the top into the hopper $p$ of an agitator, $o$, in which there is a vertical shaft, $o'$, supplied with projecting teeth $o''$, which keeps the clay stirred or agitated to prevent its clogging in the neck of the agitator, where there is a steam-injection pipe, $m$, to discharge a jet of steam upon the descending stream of pulverized clay as it falls into the receptacle $w$. This receptacle has attached to it a discharge-pipe, $r$, and a safety-valve, $x$.

The operation of this apparatus is as follows: The pulverized clay drops into the hopper $p$ bucketful at a time, and by means of the rapidly-revolving agitator $o$ is distributed evenly and regularly in the neck at the exit of the steam-injector, so that as the clay passes downward through the neck it comes in contact with the steam injected through pipe $m$, and absorbs sufficient moisture to prepare it for immediate use for molding into brick, tile, or for other purposes. The pipe $r$ is to convey out of $w$ the vapor and air which may be drawn in through the hopper by the injector. A safety-valve, $x$, is arranged to open in case pipe $r$ should from any cause become clogged.

By this apparatus and machinery an even tempering of the clay must result. First, the clay, being compressed into a thin sheet and passed through the drying-furnace, is in a proper state to be properly broken up in the disintegrator E, where it is separated from any hard foreign substances, as pebbles, stones, &c. It is then elevated to a revolving screen or sieve and sifted, so that nothing but fine clay can pass, which clay is then finely comminuted and ground into an impalpable powder, and finally elevated and passed through an agitator, so that as it drops in a loose state the steam is injected to impart the proper degree of moisture to prepare the clay for molding purposes.

I claim—

1. The method of drying clay by means of an endless apron revolving over rollers, and passing the clay reduced to a thin layer on the apron through the hot-air flue of a furnace, substantially as and for the purpose described.

2. The combination of the crushing-rollers and the endless apron arranged to pass through the hot-air flue of a furnace, substantially as and for the purpose described.

3. The combination of the endless apron $d$, arranged to pass through the hot-air flue of a furnace, and the disintegrator E, substantially as and for the purpose described.

In testimony whereof I affix my signature in presence of two witnesses.

JOHN CHRISTIANSEN.

Witnesses:
ED. H. CALLAWAY,
F. H. FENNO.